US012155324B2

United States Patent
Gizinski et al.

(10) Patent No.: US 12,155,324 B2
(45) Date of Patent: Nov. 26, 2024

(54) SYSTEMS AND METHODS FOR ESTIMATING MOTOR VELOCITY

(71) Applicant: STEERING SOLUTIONS IP HOLDING CORPORATION, Saginaw, MI (US)

(72) Inventors: Nicholas Gizinski, Farmington Hills, MI (US); Julie A. Kleinau, Bay City, MI (US); Ashish Verma, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 116 days.

(21) Appl. No.: 17/902,854

(22) Filed: Sep. 4, 2022

(65) Prior Publication Data

US 2024/0079980 A1   Mar. 7, 2024

(51) Int. Cl.
*H02P 21/18* (2016.01)
*G01P 3/00* (2006.01)
*H02P 23/14* (2006.01)

(52) U.S. Cl.
CPC .............. *H02P 21/18* (2016.02); *H02P 23/14* (2013.01); *G01P 3/00* (2013.01)

(58) Field of Classification Search
CPC ............ H02P 21/18; H02P 23/14; G01C 3/00
See application file for complete search history.

(56) References Cited

U.S. PATENT DOCUMENTS

| 4,959,806 A | * | 9/1990 | Gold ...................... G01P 11/00 700/304 |
| 9,975,570 B2 | | 5/2018 | Collier-Hallman |
| 10,173,718 B2 | | 1/2019 | Collier-Hallman |
| 2007/0143040 A1 | * | 6/2007 | Ide .......................... G01M 1/10 702/41 |
| 2014/0244113 A1 | * | 8/2014 | Collier-Hallman ....... G01P 3/64 702/147 |

FOREIGN PATENT DOCUMENTS

| CN | 102957380 B | * | 12/2014 | |
| WO | WO-0120266 A2 | * | 3/2001 | ............ B62D 5/046 |

* cited by examiner

*Primary Examiner* — Bickey Dhakal

(57) ABSTRACT

A method for determining motor velocity includes receiving motor sensor data from at least one motor sensor associated with an electric motor, the motor sensor data including a plurality of motor sensor measurements and respective time values; determining an average time value based on the respective time values for each motor sensor measurement; generating a first gain value, a second gain value, and a third gain value, the first gain value being generated based on at least the average time value; and estimating a motor velocity based on at least one motor sensor measurement, the average time value, the first gain value, the second gain value, the third gain value, and at least one previously estimated motor velocity.

20 Claims, 5 Drawing Sheets

SYSTEMS AND METHODS FOR ESTIMATING MOTOR VELOCITY

TECHNICAL FIELD

This disclosure related to electric motor control, and in particular to systems and methods for providing a fast loop motor velocity observer.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system is configured to control various aspects of steering of a vehicle.

Typically, such steering systems may include or use one or more electric motors, such as one or more permanent magnet synchronous motors (PMSM) or other suitable motors or electric machines. Motor current regulation is typically important for torque production at a motor shaft of an electric motor. To regulate motor winding currents, it is typically important to have accurate angle measurement and phase current measurements. The phase current measurements and angle measurements may be used to transform a three-phase alternating current (AC) to a direct current (DC) representation through means of a mathematical transformation (e.g., such as a Park-Clark transformation). Additionally, the angle measurement may be used to estimate rotor velocity of the motor.

SUMMARY

This disclosure relates generally to electric motor control.

An aspect of the disclosed embodiments includes a method for determining motor velocity. The method includes receiving motor sensor data from at least one motor sensor associated with an electric motor, the motor sensor data including a plurality of motor sensor measurements and respective time values; determining an average time value based on the respective time values for each motor sensor measurement; generating a first gain value, a second gain value, and a third gain value, the first gain value being generated based on at least the average time value; and estimating a motor velocity based on at least one motor sensor measurement, the average time value, the first gain value, the second gain value, the third gain value, and at least one previously estimated motor velocity.

Another aspect of the disclosed embodiments includes a system for determining motor velocity. The system includes a processor and a memory. The memory includes instructions that, when executed by the processor, cause the processor to: receive motor sensor data from at least one motor sensor associated with an electric motor, the motor sensor data including a plurality of motor sensor measurements and respective time values; determine an average time value based on the respective time values for each motor sensor measurement; generate a first gain value, a second gain value, and a third gain value, the first gain value being generated based on at least the average time value; and estimating a motor velocity based on at least one motor sensor measurement, the average time value, the first gain value, the second gain value, the third gain value, and at least one previously estimated motor velocity.

Another aspect of the disclosed embodiments includes an apparatus for determining motor velocity. The apparatus includes a processor and a memory. The memory includes instructions that, when executed by the processor, cause the processor to: receive motor angle data from at least one motor angle associated with an electric motor associated with an electronic power steering system, the motor angle data including a plurality of motor angle measurements and respective time values; determine an average time value based on the respective time values for each motor sensor measurement; generate a first gain value, a second gain value, and a third gain value, the first gain value being generated based on at least the average time value and the second gain value being generated based on at least the first gain value and the average time value; and estimating a motor velocity based on at least one motor angle measurement, the average time value, the first gain value, the second gain value, the third gain value, and at least one previously estimated motor velocity.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
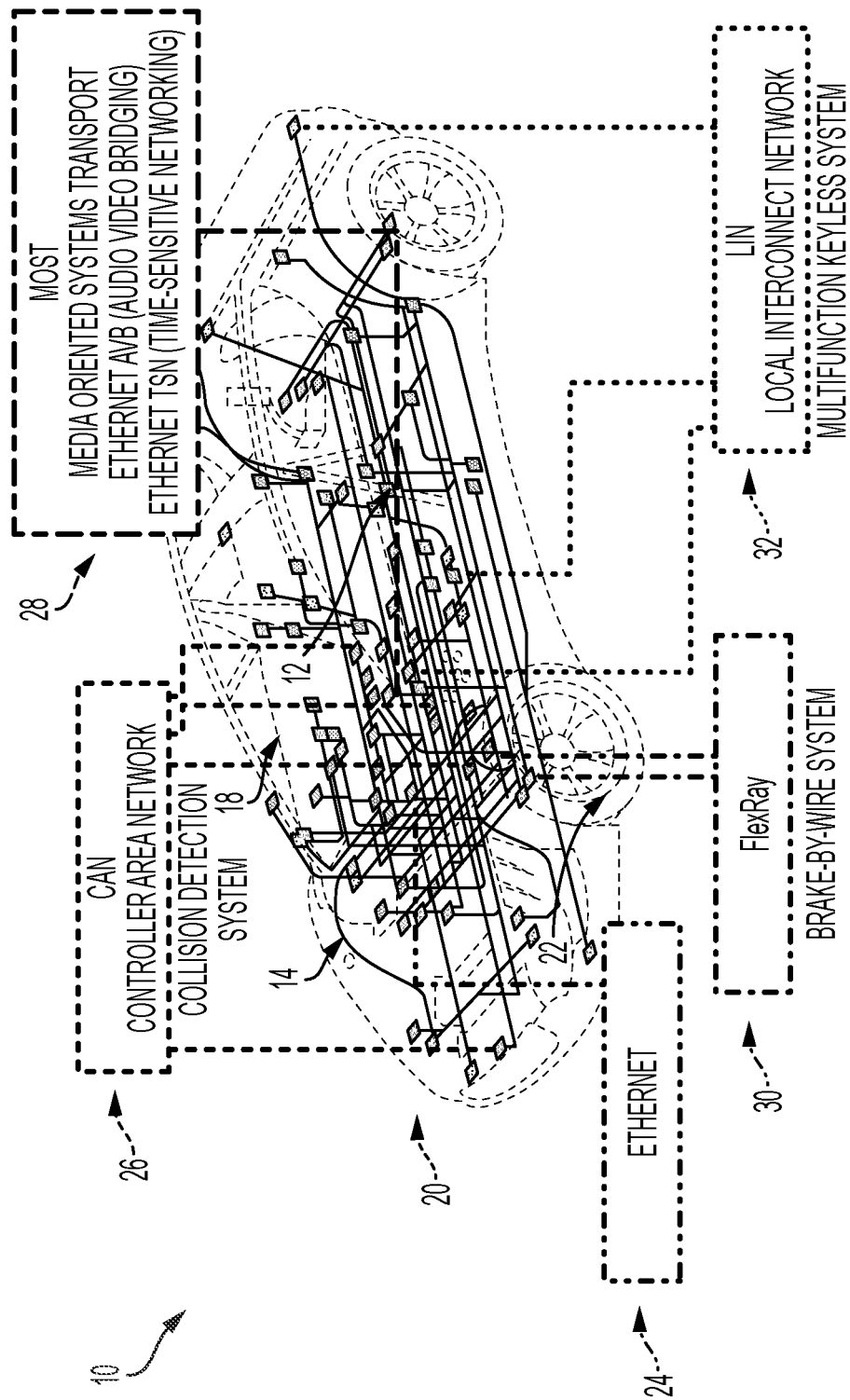
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system is configured to control various aspects of steering of a vehicle.

Typically, such steering systems may include or use one or more electric motors, such as one or more permanent magnet synchronous motors (PMSM) or other suitable motors or electric machines. Motor current regulation is typically important for torque production at a motor shaft of an electric motor. To regulate motor winding currents, it is typically important to have accurate angle measurement and phase current measurements. The phase current measurements and angle measurements may be used to transform a three-phase alternating current (AC) to a direct current (DC) representation through means of a mathematical transformation (e.g., such as a Park-Clark transformation). Additionally, the angle measurement may be used to estimate rotor velocity of the motor.

Back-EMF generated from the motor may act as a disturbance for an associated current regulator. Typical approaches to mitigate the effects a disturbance of this nature will have on current regulation include: first, increasing regulation bandwidth (e.g. regulation gains); second, using state feedback; and third, adopting a feedforward approach in parallel to the regulation to compensate. However, the first and second approaches are both prone to increased current measurement noise propagation through the regulator. Increasing the gains for these two approaches generally increases the disturbance rejection, but at the cost mentioned above.

The feedforward approach may include of a linear regression approach that operates in a 2 millisecond loop execution rate, while angle and time samples happen in the 62.5 microsecond loop. A benefit of operating this function in the 2 millisecond loop is that it uses significantly less microprocessor bandwidth to compute a velocity signal. However, one drawback of this design is that it has a predefined bandwidth and no tuning capabilities.

Accordingly, systems and methods, such as those described herein, configured to provide a fast loop velocity observer, may be desirable. In some embodiments, the systems and methods described herein may be configured create a fast loop (e.g., a 62.5 microsecond loop or other suitable loop) rate velocity observer and/or estimator that can be tuned to meet all internal specifications as well as improving the ability to reject motor control disturbances and effectively improve the EPS system response.

In some embodiments, the systems and methods described herein may be configured to utilize a fast rate execution loop that uses a second order observer with dither compensation. The second order observer (e.g., including a second order observer continuous time transfer function) may be defined according to:

$$H(s) = \frac{k_b s}{s^2 + k_a s + k_b} \text{ where } k_b \in R^+ \& k_a \in R^+$$

The gains in the above transfer function are calculated based on two criteria that are defined according to:

$$\text{Crossover frequency where } \angle\frac{\hat{\Omega}(\omega_{PhLag})}{\Omega(\omega_{PhLag})} = -\frac{\pi}{4}$$

$$\left|\frac{\hat{\Omega}(\omega)}{\Omega(\omega)}\right| \leq X \text{ dB}$$

Figure 3A:
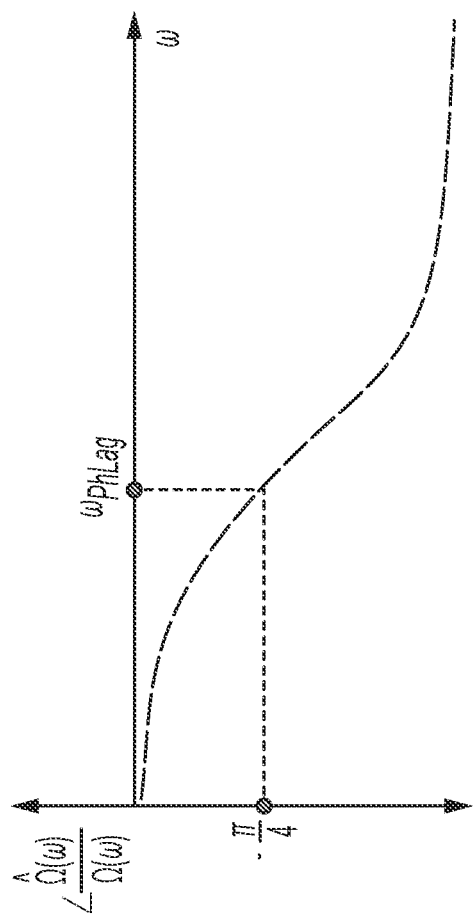
FIG. 3A graph generally illustrating phase criteria displacement according to the principles of the present disclosure.
Figure 3B:
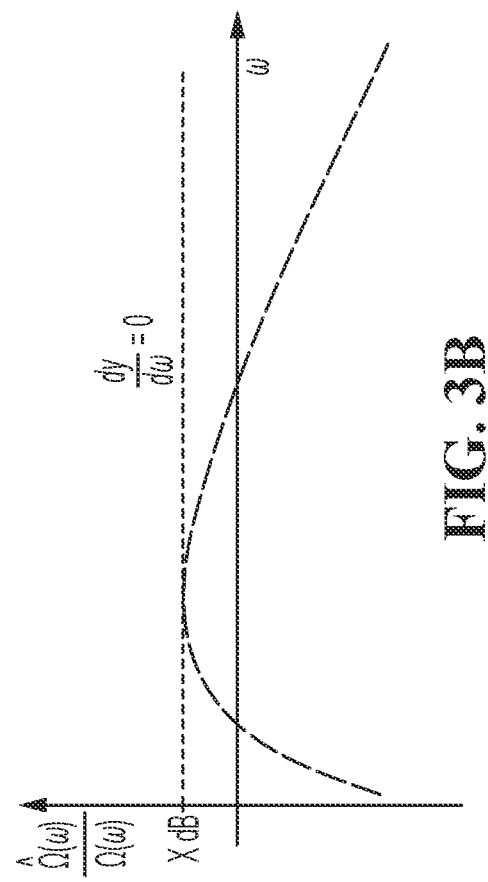
FIG. 3B graph generally illustrating magnitude criteria displacement according to the principles of the present disclosure.

Both the magnitude X dB and crossover frequency $\omega_{PhLag}$ may be tuneable per application to meet a desired EPS system level response. FIGS. 3A and 3B generally illustrate the criteria for identifying appropriate gains for the observer. The derivation for the gains may be defined according to:

$$k_b = \frac{-k_a \omega_{cf}}{\tan(\omega_{cf})} + \omega_{cf}^2$$

$$10^{\left(\frac{G}{10}\right)}k_a^4 + \frac{4*10^{\left(\frac{G}{10}\right)}\omega_{cf}}{\tan(\omega_{cf})}k_a^3 + 4\left(\frac{1}{\tan^2(\omega_{cf})} - 10^{\left(\frac{G}{10}\right)}\right)\omega_{cf}^2 k_a^2 - \frac{8\omega_{cf}^3}{\tan(\omega_{cf})}k_a + 4\omega_{cf}^4 = 0$$

As shown, there is a plurality (e.g., four) solutions for $k_a \cdot k_\alpha \in R^+$ indicates that all solutions that are negative are not considered. Additionally, or alternatively, all positive solutions may be evaluated utilizing a Bode diagram and the corresponding gains, that yield a desirable frequency response, may be selected.

A Pole-Zero matching discrete representation of the above continuous transfer function may be defined according to:

$$H(z) = k_{Scl}\left(\frac{z^{-1} - z^{-2}}{1 - k_g z^{-1} + k_{ep} z^{-2}}\right)$$

Where the corresponding gains calculated according to:

$$k_{Scl} = \frac{k_b\left(e^{\left(-T\frac{k_a - \sqrt{k_a^2 - 4k_b}}{2}\right)} - e^{\left(-T\frac{k_a + \sqrt{k_a^2 - 4k_b}}{2}\right)}\right)}{\left(\sqrt{k_a^2 - 4k_b}\right)}$$

$$k_g = e^{\left(-T\frac{k_a - \sqrt{k_a^2 - 4k_b}}{2}\right)} + e^{\left(-T\frac{k_a^2 + \sqrt{k_a^2 - 4k_b}}{2}\right)}$$

$$k_{ep} = e^{-Tk_a}$$

The systems and methods described herein may be configured to use the discrete velocity observer to yield a step response in response to a non-uniform execution rate (e.g., a non-uniform sampling where time intervals, $t_1 \neq t_2 \neq t_3 \ldots \neq t_n$, are irregular).

In some embodiments, the systems and methods described herein may be configured to reduce or eliminate a negative impact that the non-uniform execution rate has on the velocity observer. Velocity may be a highly critical signal for various vehicle or other software (e.g., including vehicle related and non-vehicle related software) functions. The systems and methods described herein may be configured to reduce or eliminate noise from a signal associated with velocity. The systems and methods described herein may be configured to mitigate the noise induced by the non-uniform execution rate. The systems and methods described herein may be configured to estimate each of the gains for the discrete transfer function as a function the time delta $t_n$, which may be defined according to:

$$\widetilde{k}_{g(T_s, T_{sNom})},$$

$$\widetilde{k}_{ep(T_s, T_{sNom})}, \text{ and}$$

$$\widetilde{k}_{Scl(T_s, T_{sNom})}$$

The discrete transfer function using the gains determined as a function the time delta $t_n$ may be defined according to:

$$H(z, t_n) = \widetilde{k}_{Scl}(t_n, T_{sNom}) \left( \frac{z^{-1} - z^{-2}}{1 - \widetilde{k}_a(t_n, T_{sNom})z^{-1} + \widetilde{k}_{ep}(t_n, T_{sNom})z^{-2}} \right)$$

The systems and methods described herein may be configured to mitigate a number microprocessor operations and overall microprocessor load, according to:

$$\widetilde{k}_a(t_n, T_{sNom}) = (t_n - T_{sNom})\Delta k_g + k_g,$$

$$\text{where } \Delta k_{Scl} = \frac{k_b \left( \left( \frac{k_a}{2} + \frac{(k_a^2 - 4k_b)^{\frac{1}{2}}}{2} \right) e^{-\frac{T_s(k_a + (k_a^2 - 4k_b)^{\frac{1}{2}})}{2}} - \left( \frac{k_a}{2} - \frac{(k_a^2 - 4k_b)^{\frac{1}{2}}}{2} \right) e^{-\frac{T_s(k_a - (k_a^2 - 4k_b)^{\frac{1}{2}})}{2}} \right)}{(k_a - 4k_b)^{\frac{1}{2}}}$$

$$\text{where } \Delta k_g = -\left( \frac{k_a}{2} + \frac{(k_a^2 - 4k_b)^{\frac{1}{2}}}{2} \right) e^{\left( -\frac{T_{sNom}(k_a + (k_a^2 - 4k_b)^{\frac{1}{2}})}{2} \right)} - \left( \frac{k_a}{2} - \frac{(k_a^2 - 4k_b)^{\frac{1}{2}}}{2} \right) e^{\left( -\frac{T_{sNom}(k_a - (k_a^2 - 4k_b)^{\frac{1}{2}})}{2} \right)}$$

$$\widetilde{k}_{ep}(t_n, T_{sNom}) = (t_n - T_{sNom})\Delta k_{ep} + k_{ep},$$

$$\text{where } \Delta k_{ep} = -k_a e^{(-T_{sNom} k_a)}$$

In some embodiments, a total number of computational operations for the velocity observer including non-uniform execution mitigation may include any suitable number of addition operations (e.g., such as five addition operations or other suitable number of addition operations) and any suitable number of multiplication operations (e.g., such as seven multiplication operations or other suitable number of multiplication operations).

Figure 4:
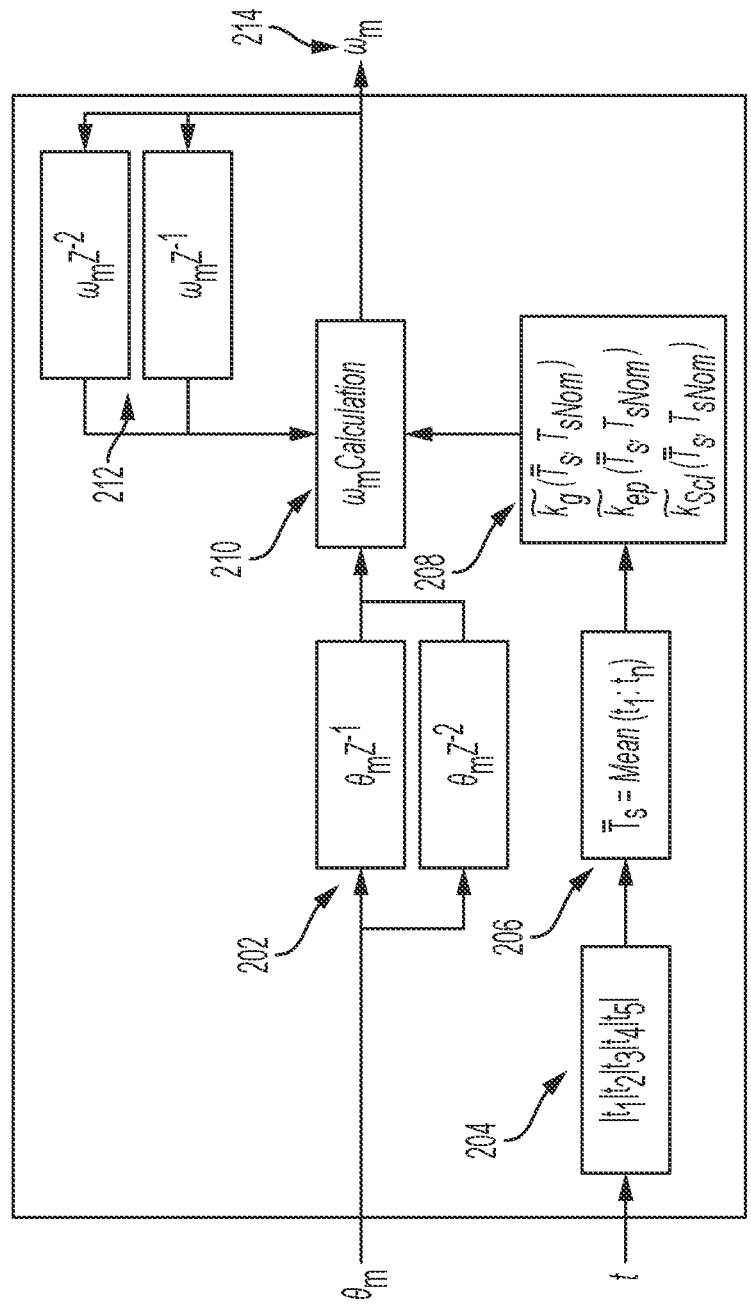
FIG. 4 generally illustrates a block diagram of a delta time average non-uniform sampling velocity observer according to the principles of the present disclosure.
Figure 5:
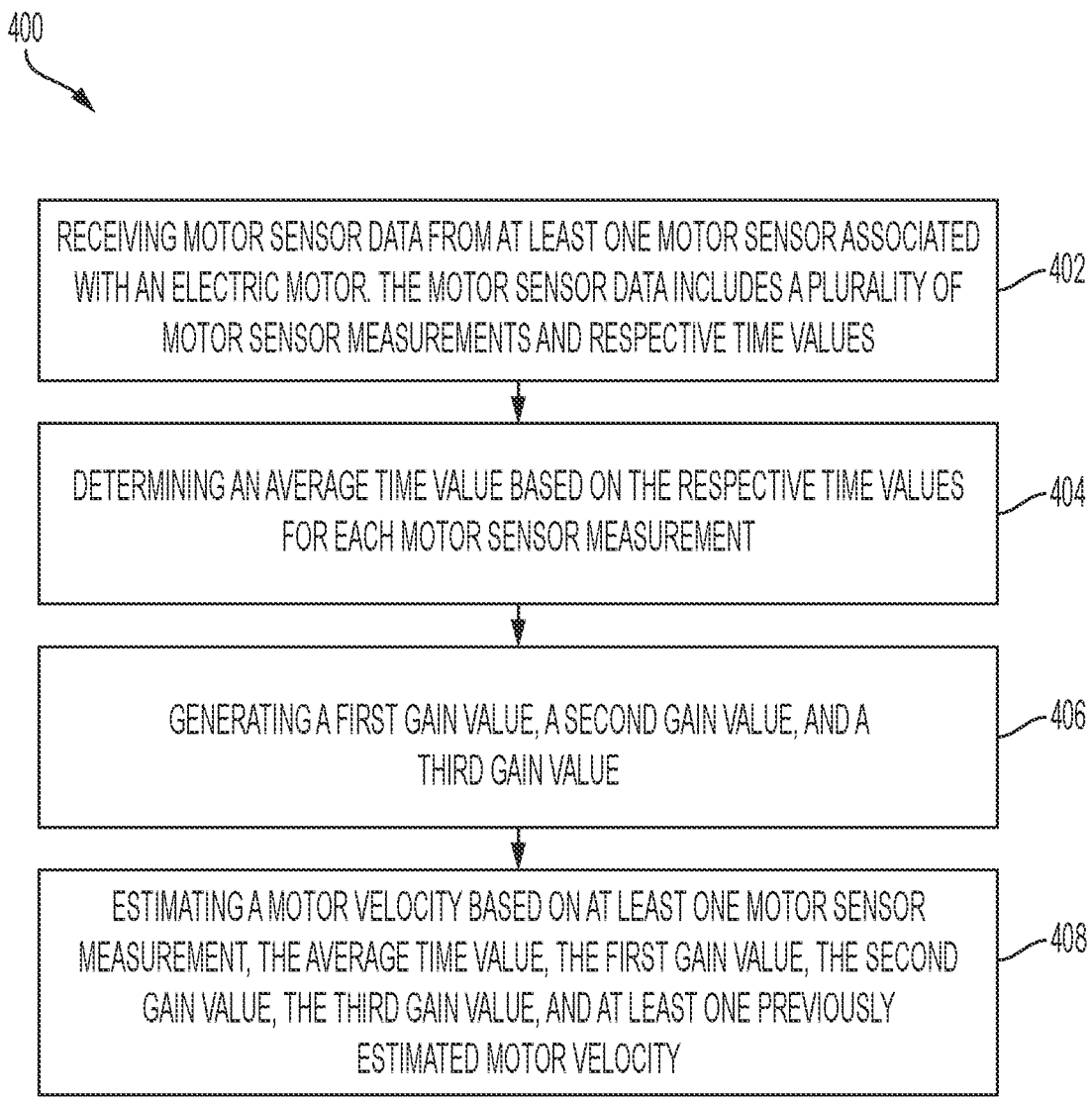
FIG. 5 is a flow diagram generally illustrating a motor velocity estimation method according to the principles of the present disclosure.

Additionally, or alternatively, as is illustrated in FIG. 4, the systems and methods described herein may be configured to perform a modification to further improve the mitigation strategy. For example, the systems and methods described herein may be configured to use a delta time average to estimate the velocity observer gains. This may result in the total number of addition operations increasing (e.g., to six addition operations or other suitable number of addition operations) and the total number of multiplication operations increasing (e.g., to eight multiplication operations or other suitable number of multiplication operations).

As is generally illustrated, the systems and methods described herein may be configured to receive a plurality of motor angle measurements 202 measured at irregular time intervals 204. The systems and methods described herein may be configured to determine an average (e.g., a mean or other suitable function) time value 206 based on each of the time values associated with the irregular time interval 204.

The systems and methods described herein may be configured to determine the velocity observer gains 208 based on the average time value 206 and a normalized average time value.

The systems and methods described herein may be configured to perform a motor velocity calculation 210 based on one or more of the motor angle measurements 202, the velocity observer gains 208, and one or more previously calculated motor velocity values 212 (e.g., during a previously performed iteration of the motor velocity calculation 210). In some embodiments, if a previously calculated motor velocity value is not available, the systems and methods described herein may be configured to use a default or baseline motor velocity value in place of the previously calculated motor velocity values (e.g., which may include any suitable motor velocity value). The systems and method described herein may be configured to output an estimated motor velocity value 214.

In some embodiments, the systems and methods described herein may be configured to use the second order observer with non-uniform sampling mitigation, which may be tuned to meet the desired system response, mitigate noise contribution due to non-uniform execution rate, and/or minimizes a number of microprocessor operations.

In some embodiments, the systems and methods described herein may be configured to provide a Pole-Zero matched discrete equivalent of a two state Leunberger observer. The systems and methods described herein may be configured to compensate for dither associated with a non-uniform sampling and/or execution loop interval. The systems and methods described herein may be configured to provide improved phase gain scheduling.

In some embodiments, the systems and methods described herein may be configured to receive motor sensor data from at least one motor sensor associated with an electric motor. The motor sensor data may a plurality of motor sensor measurements and respective time values (e.g., corresponding to an irregular sampling or execution rate). The motor sensor data may include motor angle data comprising a plurality of motor angle measurements, or other suitable data comprising other suitable measurements. The motor sensor may include a motor angle sensor, a motor position, sensor, and/or other suitable sense associated with the electric motor. The electric motor may include any suitable motor including a PMSM or other suitable motor. The electric motor may be associated with any suitable application, including vehicle operations. For, example, the electric motor may be associated with a steering system of a vehicle. The steering system may include an EPS system, a SbW system, a hydraulic steering system, and the like. It should be understood that, while the systems and methods described herein are described with reference to a vehicle steering system, the systems and methods described herein may be applicable to any suitable application and/or electric motor.

The systems and methods described herein may be configured to determine an average time value based on the respective time values for each motor sensor measurement. The systems and methods described herein may be configured to generate a first gain value, a second gain value, and a third gain value. The first gain value may be generated based on at least the average time value. The systems and methods described herein may be configured to generate a second gain value based on at least the first gain value and the average time value. The systems and methods described herein may be configured to estimate a motor velocity based on at least one motor sensor measurement, the average time value, the first gain value, the second gain value, the third gain value, and at least one previously estimated motor velocity. The systems and methods described herein may be configured to estimate the motor velocity using a discrete transfer function based on the at least one motor sensor measurement, the average time value, the first gain value, the second gain value, the third gain value, and the at least one previously estimated motor velocity. The first gain value, the second gain value, and/or the third gain value may be configured to reduce noise in the discrete transfer function.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
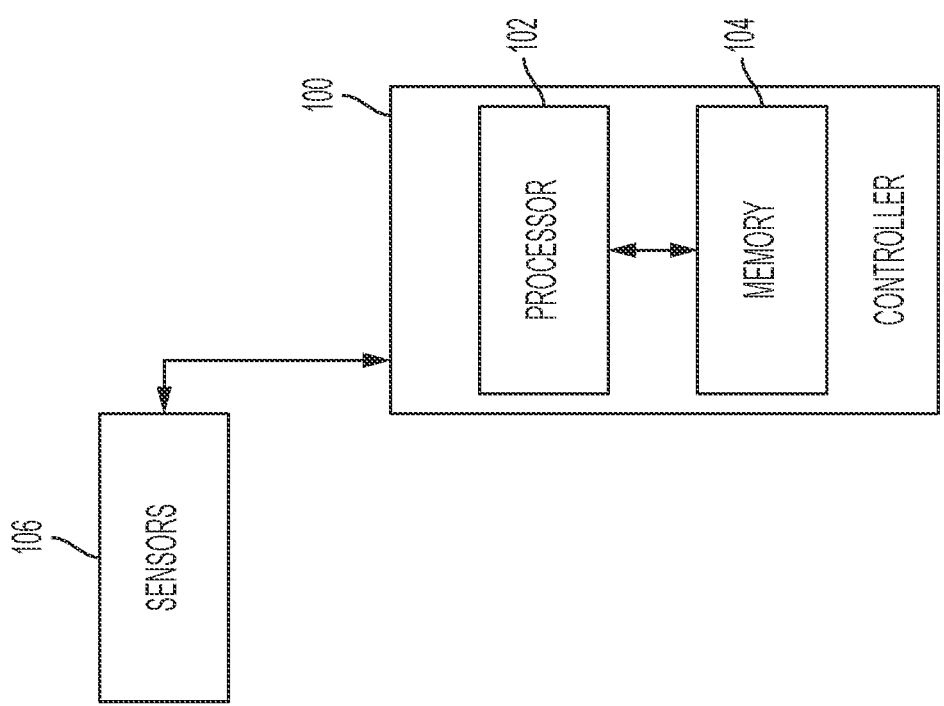
FIG. 2 generally illustrates an over learn protection system according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system and/or any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more motor angle sensors or devices, other suitable sensors or devices, or a combination thereof. The one or more signals may indicate a handwheel torque, a handwheel angel, a motor angle or motor positon, a vehicle speed, other suitable information, or a combination thereof.

In some embodiment, the controller 100 may be configured to receive motor sensor data from at least one sensor 106. The motor sensor data may a plurality of motor angle measurements and respective time values (e.g., corresponding to an irregular sampling or execution rate). The controller 100 may determine an average time value based on the respective time values for each motor angle measurement. The controller 100 may generate a first gain value, a second gain value, and/or a third gain value based on at least the average time value and/or a nominal time value. Additionally, or alternatively, the controller 100 may generate a second gain value based on at least the first gain value, the average time value, and/or a nominal time value. Additionally, or alternatively, the controller 100 may generate the third gain value based on the first gain value, the second gain value, the average time value, and/or a nominal time value.

The controller 100 may estimate a motor velocity based on at least one motor angle measurement, the average time value, the first gain value, the second gain value, the third gain value, and at least one previously estimated motor velocity. The controller 100 may estimate the motor velocity using a discrete transfer function based on the at least one motor angle measurement, the average time value, the first gain value, the second gain value, and the at least one previously estimated motor velocity. The first gain value, the second gain value, and/or the third gain value may be configured to reduce noise in the discrete transfer function.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 4 is a flow diagram generally illustrating motor velocity estimation method 400 according to the principles of the present disclosure. At 402, the method 400 receives motor sensor data from at least one motor sensor associated with an electric motor. The motor sensor data may include a plurality of motor sensor measurements and respective time values. For example, the controller 100 may receive the motor sensor data from the sensor 106.

At 404, the method 40 determines an average time value based on the respective time values for each motor sensor measurement. For example, the controller 100 may determine the average time value based on the respective time values for each motor sensor measurement.

At 406, the method 400 generates a first gain value, a second gain value, and a third gain value, where the first gain value is generated based on at least the average time value. For example, the controller 100 may generate the first gain value, the second gain value, and/or the third gain value.

At 408, the method 400 estimates a motor velocity based on at least one motor sensor measurement, the average time value, the first gain value, the second gain value, the third gain value, and at least one previously estimated motor velocity. For example, the controller 100 may estimate the motor velocity based on the at least one motor sensor measurement, the average time value, the first gain value, the second gain value, the third gain value, and the at least one previously estimated motor velocity.

In some embodiments, a method for determining motor velocity includes receiving motor sensor data from at least one motor sensor associated with an electric motor. The motor sensor data includes a plurality of motor sensor measurements and respective time values. The method also includes determining an average time value based on the respective time values for each motor sensor measurement, generating a first gain value based on at least the average time value, and estimating a motor velocity based on at least one motor sensor measurement, the average time value, the first gain value, and at least one previously estimated motor velocity.

In some embodiments, the motor sensor measurements include motor angle measurements. In some embodiments, the method also includes generating a second gain value based on at least the first gain value and the average time value. In some embodiments, the method also includes estimating the motor velocity further based on the second gain value. In some embodiments, estimating the motor velocity based on the at least one motor sensor measurement, the average time value, the first gain value, the second gain value, and the at least one previously estimated motor velocity includes using a discrete transfer function based on the at least one motor sensor measurement, the average time value, the first gain value, the second gain value, and the at least one previously estimated motor velocity. In some embodiments, the first gain value and the second gain value are configured to reduce noise in the discrete transfer function. In some embodiments, the respective time values correspond to an irregular sampling rate. In some embodiments, the electric motor is associated with an electronic power steering system.

In some embodiments, a system for determining motor velocity includes a processor and a memory. The memory includes instructions that, when executed by the processor, cause the processor to: receive motor sensor data from at least one motor sensor associated with an electric motor, the motor sensor data including a plurality of motor sensor measurements and respective time values; determine an average time value based on the respective time values for each motor sensor measurement; generate a first gain value based on at least the average time value; and estimate a motor velocity based on at least one motor sensor measurement, the average time value, the first gain value, and at least one previously estimated motor velocity.

In some embodiments, the motor sensor measurements include motor angle measurements. In some embodiments, the instructions further cause the processor to generate generating a second gain value based on at least the first gain value and the average time value. In some embodiments, the instructions further cause the processor to estimate the motor velocity further based on the second gain value. In some embodiments, the instructions further cause the processor to estimate the motor velocity based on the at least one motor sensor measurement, the average time value, the first gain value, the second gain value, and the at least one previously estimated motor velocity using a discrete transfer function based on the at least one motor sensor measurement, the average time value, the first gain value, the second gain value, and the at least one previously estimated motor velocity. In some embodiments, the first gain value and the second gain value are configured to reduce noise in the discrete transfer function. In some embodiments, the respective time values correspond to an irregular sampling rate. In some embodiments, the electric motor is associated with an electronic power steering system.

In some embodiments, an apparatus for determining motor velocity includes a processor and a memory. The memory includes instructions that, when executed by the processor, cause the processor to: receive motor angle data from at least one motor angle associated with an electric motor associated with an electronic power steering system, the motor angle data including a plurality of motor angle measurements and respective time values; determine an average time value based on the respective time values for each motor sensor measurement; generate a first gain value based on at least the average time value; generate generating a second gain value based on at least the first gain value and the average time value; and estimate a motor velocity based on at least one motor angle measurement, the average time value, the first gain value, the second gain value, and at least one previously estimated motor velocity.

In some embodiments, the instructions further cause the processor to estimate the motor velocity based on the at least one motor angle measurement, the average time value, the first gain value, the second gain value, and the at least one previously estimated motor velocity using a discrete transfer function based on the at least one motor angle measurement, the average time value, the first gain value, the second gain value, and the at least one previously estimated motor velocity. In some embodiments, the first gain value and the second gain value are configured to reduce noise in the discrete transfer function. In some embodiments, the respective time values correspond to an irregular sampling rate.

In some embodiments, a method for determining motor velocity includes receiving motor sensor data from at least one motor sensor associated with an electric motor, the motor sensor data including a plurality of motor sensor measurements and respective time values; determining an average time value based on the respective time values for each motor sensor measurement; generating a first gain value, a second gain value, and a third gain value, the first gain value being generated based on at least the average time value; and estimating a motor velocity based on at least one motor sensor measurement, the average time value, the first gain value, the second gain value, the third gain value, and at least one previously estimated motor velocity.

In some embodiments, the motor sensor measurements include motor angle measurements. In some embodiments, the second gain value is generated based on at least the first gain value and the average time value. In some embodiments, the method also includes estimating the motor velocity further based at least one other previously estimated motor velocity, wherein the at least one other previously estimated motor velocity is estimated before the at least one previously estimated motor velocity. In some embodiments, estimating the motor velocity includes using a discrete transfer function based on the at least one motor sensor measurement, the average time value, the first gain value, the second gain value, the third gain value, and the at least one previously estimated motor velocity. In some embodiments, the first gain value, the second gain value, and the third gain value are configured to reduce noise in the discrete transfer function. In some embodiments, the respective time values correspond to an irregular sampling rate. In some embodiments, the electric motor is associated with an electronic power steering system.

In some embodiments, a system for determining motor velocity includes a processor and a memory. The memory includes instructions that, when executed by the processor, cause the processor to: receive motor sensor data from at least one motor sensor associated with an electric motor, the motor sensor data including a plurality of motor sensor measurements and respective time values; determine an average time value based on the respective time values for each motor sensor measurement; generate a first gain value, a second gain value, and a third gain value, the first gain value being generated based on at least the average time value; and estimating a motor velocity based on at least one motor sensor measurement, the average time value, the first gain value, the second gain value, the third gain value, and at least one previously estimated motor velocity.

In some embodiments, the motor sensor measurements include motor angle measurements. In some embodiments, the second gain value is generated based on at least the first gain value and the average time value. In some embodiments, the instructions further cause the processor to estimate the motor velocity further based on at least one other previously estimated motor velocity, wherein the at least one other previously estimated motor velocity is estimated before the at least one previously estimated motor velocity. In some embodiments, the instructions further cause the processor to estimate the motor velocity using a discrete transfer function based on the at least one motor sensor measurement, the average time value, the first gain value, the second gain value, the third gain value, and the at least one previously estimated motor velocity. In some embodiments, the first gain value, the second gain value, and the third gain value are configured to reduce noise in the discrete transfer function. In some embodiments, the respective time values correspond to an irregular sampling rate. In some embodiments, the electric motor is associated with an electronic power steering system.

In some embodiments, an apparatus for determining motor velocity includes a processor and a memory. The memory includes instructions that, when executed by the processor, cause the processor to: receive motor angle data from at least one motor angle associated with an electric motor associated with an electronic power steering system, the motor angle data including a plurality of motor angle measurements and respective time values; determine an average time value based on the respective time values for each motor sensor measurement; generate a first gain value, a second gain value, and a third gain value, the first gain value being generated based on at least the average time value and the second gain value being generated based on at least the first gain value and the average time value; and estimating a motor velocity based on at least one motor angle measurement, the average time value, the first gain value, the second gain value, the third gain value, and at least one previously estimated motor velocity.

In some embodiments, the instructions further cause the processor to estimate the motor velocity using a discrete transfer function based on the at least one motor angle measurement, the average time value, the first gain value, the second gain value, the third gain value, and the at least one previously estimated motor velocity. In some embodiments, the first gain value, the second gain value, and the third gain value are configured to reduce noise in the discrete transfer function. In some embodiments, the respective time values correspond to an irregular sampling rate.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for determining motor velocity, the method comprising:
   receiving motor sensor data from at least one motor sensor associated with an electric motor, the motor sensor data including a plurality of motor sensor measurements and respective time values;
   determining an average time value based on the respective time values for each motor sensor measurement;
   generating a first gain value, a second gain value, and a third gain value, the first gain value being generated based on at least the average time value;
   estimating a motor velocity based on at least one motor sensor measurement, the average time value, the first gain value, the second gain value, the third gain value, and at least one previously estimated motor velocity;
   generating an assist torque based on the estimated motor velocity; and
   controlling the electric motor based on the assist torque to provide steering assist to an operator of a vehicle.

2. The method of claim 1, wherein the motor sensor measurements include motor angle measurements.

3. The method of claim 1, wherein the second gain value is generated based on at least the first gain value and the average time value.

4. The method of claim 1, further comprising estimating the motor velocity further based at least one other previously estimated motor velocity, wherein the at least one other previously estimated motor velocity is estimated before the at least one previously estimated motor velocity.

5. The method of claim 1, wherein estimating the motor velocity includes using a discrete transfer function based on the at least one motor sensor measurement, the average time value, the first gain value, the second gain value, the third gain value, and the at least one previously estimated motor velocity.

6. The method of claim 5, wherein the first gain value, the second gain value, and the third gain value are configured to reduce noise in the discrete transfer function.

7. The method of claim 1, wherein the respective time values correspond to an irregular sampling rate.

8. The method of claim 1, wherein the electric motor is associated with an electronic power steering system.

9. A system for determining motor velocity, the system comprising:
a processor; and
a memory including instructions that, when executed by the processor, cause the processor to:
receive motor sensor data from at least one motor sensor associated with an electric motor, the motor sensor data including a plurality of motor sensor measurements and respective time values;
determine an average time value based on the respective time values for each motor sensor measurement;
generate a first gain value, a second gain value, and a third gain value, the first gain value being generated based on at least the average time value;
estimating a motor velocity based on at least one motor sensor measurement, the average time value, the first gain value, the second gain value, the third gain value, and at least one previously estimated motor velocity;
generate an assist torque based on the estimated motor velocity; and
control the electric motor based on the assist torque to provide steering assist to an operator of a vehicle.

10. The system of claim 9, wherein the motor sensor measurements include motor angle measurements.

11. The system of claim 9, wherein the second gain value is generated based on at least the first gain value and the average time value.

12. The system of claim 9, wherein the instructions further cause the processor to estimate the motor velocity further based on at least one other previously estimated motor velocity, wherein the at least one other previously estimated motor velocity is estimated before the at least one previously estimated motor velocity.

13. The system of claim 9, wherein the instructions further cause the processor to estimate the motor velocity using a discrete transfer function based on the at least one motor sensor measurement, the average time value, the first gain value, the second gain value, the third gain value, and the at least one previously estimated motor velocity.

14. The system of claim 13, wherein the first gain value, the second gain value, and the third gain value are configured to reduce noise in the discrete transfer function.

15. The system of claim 9, wherein the respective time values correspond to an irregular sampling rate.

16. The system of claim 9, wherein the electric motor is associated with an electronic power steering system.

17. An apparatus for determining motor velocity, the apparatus comprising:
a processor; and
a memory including instructions that, when executed by the processor, cause the processor to:
receive motor angle data from at least one motor angle associated with an electric motor associated with an electronic power steering system, the motor angle data including a plurality of motor angle measurements and respective time values;
determine an average time value based on the respective time values for each motor sensor measurement;
generate a first gain value, a second gain value, and a third gain value, the first gain value being generated based on at least the average time value and the second gain value being generated based on at least the first gain value and the average time value;
estimate a motor velocity based on at least one motor angle measurement, the average time value, the first gain value, the second gain value, the third gain value, and at least one previously estimated motor velocity; and
control the electric motor based on the estimated motor velocity to provide steering assist to an operator of a vehicle.

18. The apparatus of claim 17, wherein the instructions further cause the processor to estimate the motor velocity using a discrete transfer function based on the at least one motor angle measurement, the average time value, the first gain value, the second gain value, the third gain value, and the at least one previously estimated motor velocity.

19. The apparatus of claim 18, wherein the first gain value, the second gain value, and the third gain value are configured to reduce noise in the discrete transfer function.

20. The apparatus of claim 17, wherein the respective time values correspond to an irregular sampling rate.

* * * * *